United States Patent [19]
Perez

[11] Patent Number: 5,720,048
[45] Date of Patent: Feb. 24, 1998

[54] CANINE TOOTHBRUSH IN GLOVE FORM

[76] Inventor: Jorge Alexander Perez, Suite 200, Ft. Lauderdale, Fla. 33308

[21] Appl. No.: 714,665

[22] Filed: Sep. 16, 1996

[51] Int. Cl.⁶ .................................................. A41D 19/00
[52] U.S. Cl. .................. 2/161.6; 2/159; 2/161.8; 2/167; 15/167.1; 15/227
[58] Field of Search ................ 2/158, 159, 160, 2/161.1, 161.2, 161.3, 161.4, 161.5, 161.6, 161.7, 161.8, 163, 167, 168, 169, 910, 917; 15/167.1, 227; 119/600, 601, 612, 625, 632, 707, 83; 433/1

[56] References Cited

U.S. PATENT DOCUMENTS

| | | | |
|---|---|---|---|
| 2,068,400 | 1/1937 | De Rome | 15/227 |
| 3,018,498 | 1/1962 | Wasserman | 15/227 |
| 5,009,195 | 4/1991 | Damm | 15/227 |
| 5,392,482 | 2/1995 | Drulias et al. | 15/227 |
| 5,502,863 | 4/1996 | Perkins | 15/227 |
| 5,524,575 | 6/1996 | Lennon | 119/625 |

FOREIGN PATENT DOCUMENTS

| | | | |
|---|---|---|---|
| 2598064 | 11/1987 | France | 2/159 |
| 3507698 | 9/1986 | Germany | 119/83 |
| 59313 | 7/1936 | Norway | 15/227 |
| 3643 | 2/1884 | United Kingdom | 15/227 |
| 428281 | 5/1935 | United Kingdom | 15/227 |
| 2108372 | 5/1983 | United Kingdom | 2/159 |
| 2143720 | 2/1985 | United Kingdom | 2/159 |
| 2252235 | 8/1992 | United Kingdom | 119/83 |

*Primary Examiner*—Jeanette E. Chapman
*Attorney, Agent, or Firm*—Kane, Dalsimer, Sullivan, Kurucz, Levy, Eisele and Richard, LLP

[57] ABSTRACT

A full glove of water-proof material such as rubber includes a thumb, index and long finger having short firm bristles on the exterior, for brushing canine teeth.

1 Claim, 1 Drawing Sheet

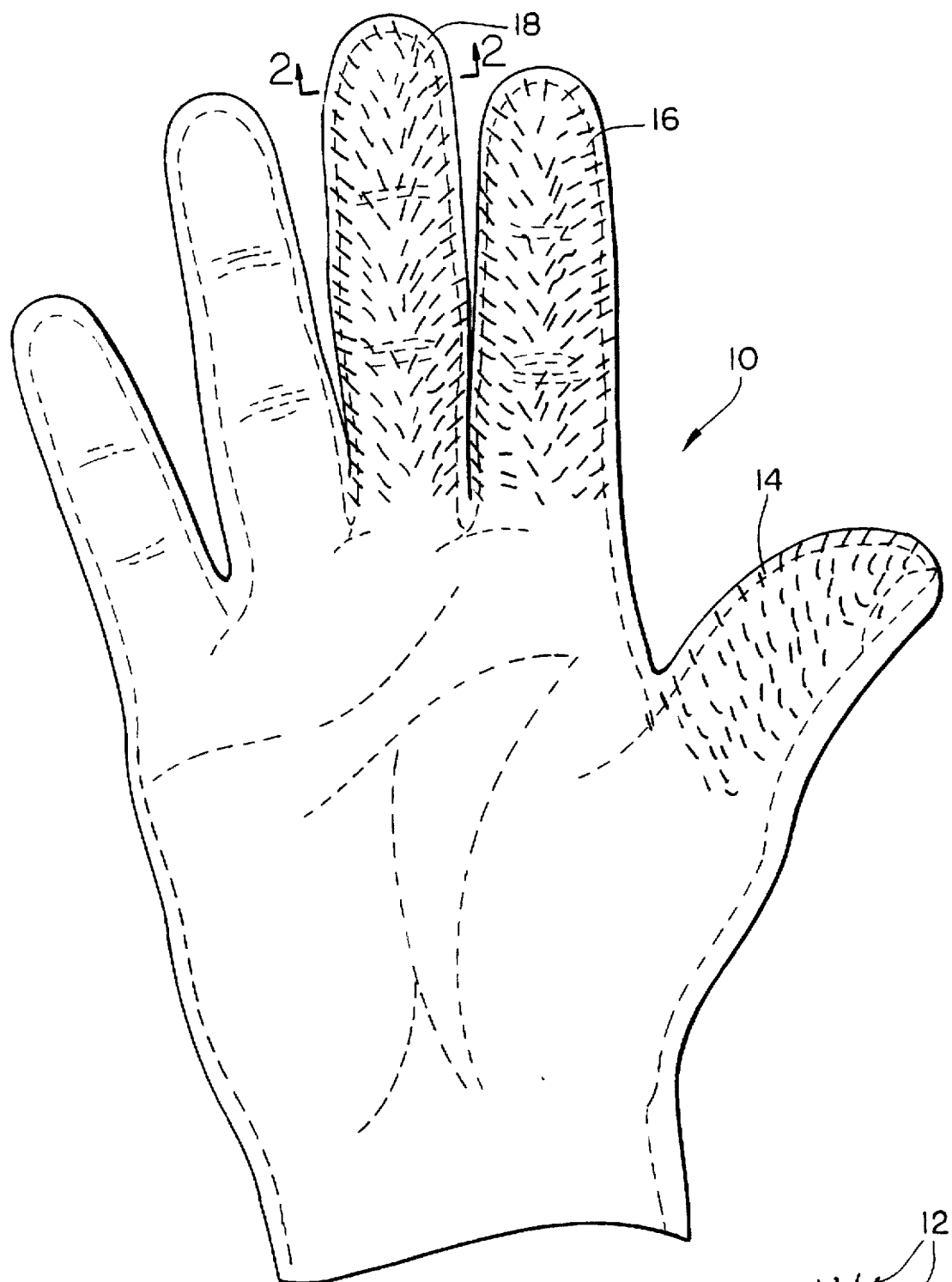
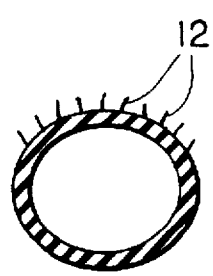
FIG. 1
FIG. 2

CANINE TOOTHBRUSH IN GLOVE FORM

BACKGROUND OF THE INVENTION

Dogs are subject to tooth decay and calculus build up which together with lodged food particles contribute to unpleasant breath. Moreover, periodontal and related gum disease is a recurring problem in dogs.

Some dog owners adhere to regular schedule visits to a veterinarian for tooth cleaning and scraping. These visits, for some owners, become prohibitively expensive.

The prior art has suggested specially designed tooth brushes that conform to the canine jaw and disposition of canine teeth. For example, see U.S. Pat. No. 4,031,587. A single finger condom-like devices are available in pet supply stores.

The problem with prior art devices and techniques is the lack of protection of the hand of a dog owner or veterinarian from saliva, bites, infections, disease, etc. as well as the spread of disease and infection to the dog by such individuals.

SUMMARY OF THE INVENTION

A principal object of the present invention is the provision of an improved device and technique for the overall dental hygiene of a pet, particularly a dog, that protects the dog and person attending to the dog from disease and infection and the hand of this person from saliva and bites.

Another object is to provide a device and technique of the foregoing type in the form of glove that provides a shield for the hand that prevents the hand from contacting the pet's mouth during brushing.

A further object is to provide a glove of the foregoing type possesses bristles on the fingers that effectively removes food, calculus, dirt and debris from the animal's teeth and mouth.

Other objects and advantages will become apparent from the following detailed description which should be taken in conjunction with the accompanying drawings.

BRIEF DESCRIPTION OF THE DRAWINGS

FIG. 1 is an elevational view of a pet tooth cleaning glove of this invention provided with bristles on the thumb, index and middle finger.

FIG. 2 is a cross-sectional view taken along the line 2—2 of FIG. 1.

DETAILED DESCRIPTION

In the drawings, a glove 10 is provided for brushing a pet's teeth, particularly a dog's teeth, as part of overall dental and gum hygiene and care of the animal. The glove is preferably flexible and made of relatively thick material such as a rubber or any other suitable elastomer, similar to those gloves used for dish washing purposes that will protect against dog bites and is waterproof to protect the hands from saliva, disease and infection. In addition, the glove 10 will have short, firm bristles 12 of similar elastomeric or plastic material on the inner face or part of a number of the fingers such as the thumb 14 fore or index 16, and middle or long fingers 18. The bristles 12 should be of stiffness sufficient to provide effective scrubbing action for the teeth and massaging of the gums. Obviously, the bristles may be on the entire exterior part of the fingers or may be on all of the fingers or even the entire exterior of the glove.

The glove 10 may be supplied in a collapsed form for sale and storage and may be easily opened for finger insertion. The glove and bristles 12 may be supplied in sterile or sanitary condition which may be maintained in suitable packaging prior to use. The glove may be disposable after a single use or sanitized after each use for further use. Obviously, the glove 10 may be supplied in different sizes.

In use, one's hand is inserted into the glove 10 with the bristles 12 extending outwardly from the inner glove face. The fingers with the bristles are inserted into the pet's mouth with or without a suitable canine dentifrice. The hand and fingers are manipulated or moved in the recommended manner to massage the gums and clean the teeth.

Although a single somewhat preferred embodiment of the invention has been disclosed and described in detail herein, it should be understood that this invention is in no sense limited thereby and its scope is to be determined by that of the appended claims.

I claim:

1. A glove for cleaning the teeth and overall dental hygiene of an animal and that provides a shields for a hand that prevents the hand from contacting the animal's mouth during brushing, the glove being made of a water-proof, relatively thick and flexible elastomeric material, the glove having fingers for all the fingers of the hand of an individual, at least one of the fingers of the glove having relatively short, firm bristles for brushing the animal's teeth by removing food, calculous, dirt and debris from the animal's teeth and mouth, and the bristles being relatively short, firm and sufficiently stiff to provide effective scrubbing action of the teeth and massaging of the gums, the glove being so constructed and arranged to protect the wearer's entire hand from saliva, bites, infection and disease and to protect the animal from infection and disease, the fingers of the glove including a thumb, forefinger, and index finger which have an inner face and the bristles extending outwardly from the inner face of only the thumb, forefinger and index finger.

* * * * *